United States Patent [19]
Bang

[11] Patent Number: 6,021,012
[45] Date of Patent: Feb. 1, 2000

[54] AUTOMATIC SERVO ADDRESS MARK DETECTION AND SERVO TIMING COMPENSATION CIRCUIT

[75] Inventor: Ho-Yul Bang, Suwon, Rep. of Korea

[73] Assignee: SamSung Electronics Co., Ltd., Suwon, Rep. of Korea

[21] Appl. No.: 08/884,486

[22] Filed: Jun. 27, 1997

[30] Foreign Application Priority Data

Jun. 27, 1996 [KR] Rep. of Korea ................. 96-24447

[51] Int. Cl.[7] .................................................. G11B 5/09
[52] U.S. Cl. ........................................... 360/51; 360/53
[58] Field of Search ........................ 360/51, 53, 77.08, 360/78.14

[56] References Cited

U.S. PATENT DOCUMENTS

| | | |
|---|---|---|
| 4,544,968 | 10/1985 | Anderson et al. . |
| 4,823,212 | 4/1989 | Knowles et al. . |
| 4,977,472 | 12/1990 | Volz et al. . |
| 5,210,660 | 5/1993 | Hetzler . |
| 5,231,545 | 7/1993 | Gold . |
| 5,313,340 | 5/1994 | Takayama et al. ............. 360/51 X |
| 5,384,671 | 1/1995 | Fisher . |
| 5,396,240 | 3/1995 | Schowe ........................... 360/51 X |
| 5,420,730 | 5/1995 | Moon et al. . |
| 5,442,499 | 8/1995 | Emori . |
| 5,477,103 | 12/1995 | Romano et al. . |
| 5,517,371 | 5/1996 | Takei . |
| 5,544,135 | 8/1996 | Akin, Jr. et al. . |

*Primary Examiner*—Alan Faber
*Attorney, Agent, or Firm*—Robert E. Bushnell, Esq.

[57] ABSTRACT

An automatic servo address mark detecting and servo timing compensating circuit of a disk drive includes a servo address mark detection window generating unit for generating a servo address mark detection missing signal and count control signal where the servo address mark is not detected within a range of a servo address mark window of a predetermined servo sector; a servo address mark missing signal counter, which is reset according to a servo address mark detection signal, for generating a servo address mark search signal and pseudo servo address mark where a servo address mark detection missing signal count matches data loaded from the control unit; a servo address mark search controller for selecting the servo address mark search signal and pseudo servo address mark among multiple signals input by the servo address mark missing signal counter according to a select signal input by the control unit; and a servo timing compensation unit for counting system clocks, starting from the data loaded from the control unit and compensating for a delay of servo timing where the count control signal is input.

22 Claims, 9 Drawing Sheets

AUTOMATIC SERVO ADDRESS MARK DETECTION AND SERVO TIMING COMPENSATION CIRCUIT

CLAIM OF PRIORITY

This application claims all benefits accruing under 35 U.S.C. §119 from an application for AUTOMATIC SERVO ADDRESS MARK DETECTION AND SERVO TIMING COMPENSATION CIRCUIT earlier filed in the Korean Industrial Property Office on the 27th day of June 1996 and there duly assigned Ser. No. 24447/1996.

BACKGROUND OF THE INVENTION

1. Field of the Invention

This invention relates to servo address mark detection in a disk drive, and more particularly, relates to a circuit for automatically detecting a servo address mark (SAM) and compensating for servo timing delay in response to misdetection of a servo address mark in a disk drive.

2. Related Art

Hard disk drives typically include one or more magnetic disks defining a multiplicity of concentric data tracks. Magnetic disk drives having high data density generally rely upon head position control systems for moving a selected transducer (head) from a departure track to a destination track location during track seeking operations, for settling the head at the vicinity of the destination track during track settling operations, and for following the centerline of the destination track during track following operations when data information is written on or read from the disk. Contemporary disk drive architectures having head position control systems using servo information detection are disclosed in U.S. Pat. No. 4,823,212 for Sampled Servo Code Format An System For A Disc Drive issued to Knowles et al., U.S. Pat. No. 4,977,472 for Servo Address System issued to Volz et al., U.S. Pat. No. 5,210,660 for Sectored Servo Independent Of Data Architecture issued to Hetzler, and U.S. Pat. No. 5,515,371 for Track Sector Detection System For Rotating Disk Data Storage Apparatus issued to Takei.

Generally, disk drive designs embed servo head position information within the concentric data tracks of a magnetic disk. This embedded information is usually recorded in evenly spaced apart areas or sectors of the track. The embedded servo information includes servo head position and track/data identification fields, and typically includes a unique servo address mark (SAM) pattern which is provided to resynchronize timers for recovering the servo head position and the track/data identification field information, and which mark in time expected arrival of the next embedded servo sector. As a result, reliable detection of the servo address mark pattern in each servo sector is essential for precisely marking in time not only the servo sector and its positioning information fields, but also the following user data storage area. If a servo address mark (SAM) is corrupted or misdetected, subsequent servo sectors may be overwritten. Recent efforts to ensure reliable detection of servo address mark pattern in a disk drive are disclosed, for example, in U.S. Pat. No. 5,231,545 for Fault Tolerant RLL Data Sector Address Mark Decoder issued to Gold, U.S. Pat. No. 5,384,671 for PRML Sampled Data Channel Synchronous Servo Detector issued to Fisher, U.S. Pat. No. 5,420, 730 for Servo Data Recovery Circuit For Disk Drive Having Digital Embedded Sector Servo issued to Moon et al., U.S. Pat. No. 5,442,499 for Method Of Detecting Sector Servo Information In A Disk System issued to Emori, U.S. Pat. No. 5,477,103 for Sequence, Timing And Synchronization Technique For Servo System Controller Of A Computer Disk Mass Storage Device issued to Romano et al., and U.S. Pat. No. 5,544,135 for Fault Tolerant Servo Address Mark For Disk Drive issued to Akin, Jr. et al. While the servo data detection techniques of Moon '730, Emori '499 and Akin '135 require sophisticated circuitry and possess their own merits, I have noted however, that further improvements in the servo address mark detection can be made to reliably detect the servo address mark (SAM) of a pertinent servo sector where the servo address mark (SAM of the servo sector is not detected in order to prevent recorded servo sector information from being destroyed during subsequent write operations.

SUMMARY OF THE INVENTION

Accordingly, it is an object of the present invention is to provide a disk drive having improved servo address mark detection and servo timing compensation functions.

It is also an object to provide a disk drive and circuit for automatically detecting a servo address mark contained in a servo sector without overload resulting from misdetection of a servo address mark, and for compensating for servo timing delay due to misdetection of a servo address mark.

These and other objects of the present invention can be achieved by an automatic servo address mark detection and servo timing compensation circuit for a disk drive including a controller which stores and outputs initial values for detecting servo and data information in synchronization with a point of servo address mark detection. The circuit includes a servo address mark detection window generating unit for generating a servo address mark detection missing signal and a count control signal where the servo address mark is not detected within a range of a servo address mark window of a predetermined servo sector; a servo address mark missing signal counter, which is reset according to a servo address mark detection signal, for generating a servo address mark search signal and a pseudo servo address mark signal when a servo address mark detection missing signal count corresponds to data loaded from the controller; a servo address mark search mode controller for selecting one of the servo address mark search signal and the pseudo servo address mark signal in response to a select signal loaded from the controller; and a servo timing compensation unit for counting system clocks, starting from the data loaded from the controller, and compensating for a delay of servo timing in response to the count control signal.

The present invention is more specifically described in the following paragraphs by reference to the drawings attached only by way of example.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
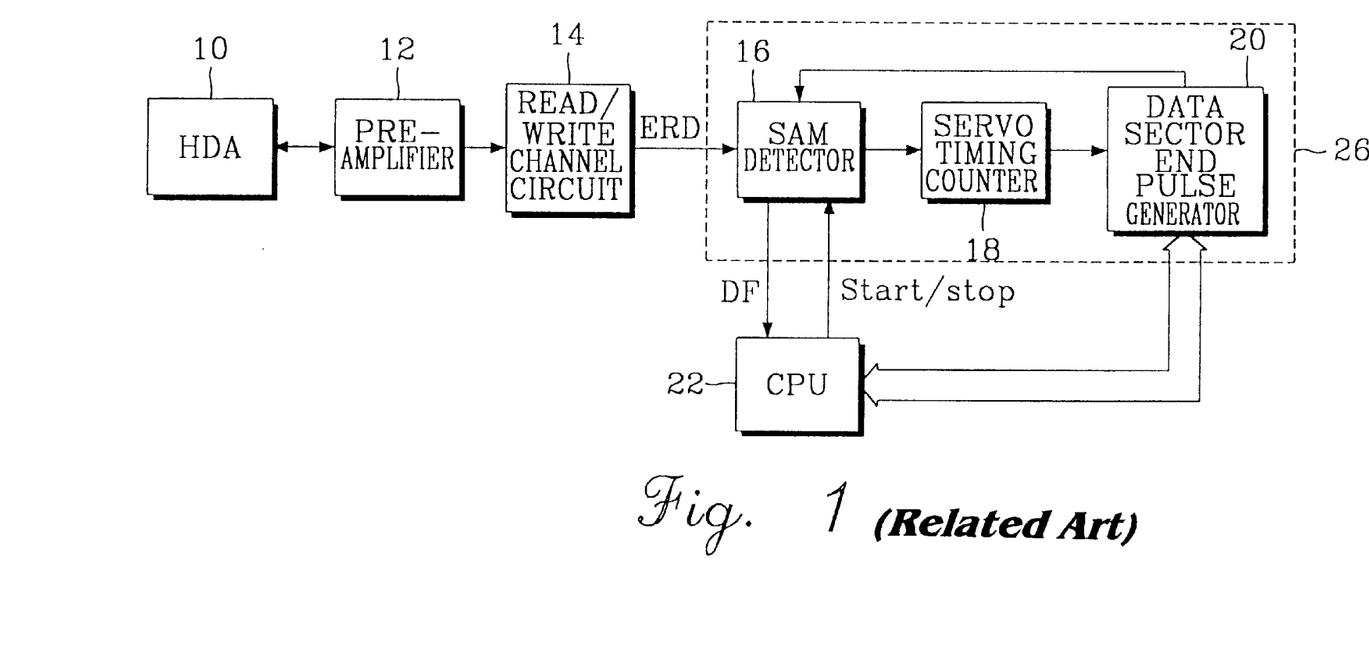
FIG. 1 is a block diagram of a contemporary hard disk drive.

Referring now to the drawings and particularly to FIG. 1 which illustrates a contemporary disk drive having a servo address mark detection function. The disk drive includes a head disk assembly (HDA) 10, a pre-amplifier 12 connected to HDA 10, a read/write channel circuit 14 connected to pre-amplifier 12, and a gate array 26 which comprises a servo address mark (SAM) detector 16, a servo timing counter 18, and a data sector end pulse generator 20 under control of a central processing unit (CPU) 22.

The HDA 10 typically includes a base, a spindle motor formed therein, or fixedly attached to the base, for supporting at least one data storage disk rotated by the spindle motor at a predetermined angular velocity, a voice coil actuator structure including an actuator for positioning a selected transducer (head) among a multiplicity of concentric data tracks formed on each major surface of the disk. The concentric data tracks on each surface of the disk include therein a series of circumferentially spaced apart, embedded servo sectors which are used to provide discrete samples of head positioning and timing information, including a servo address mark (SAM) which is detected in accordance with the principles of the present invention.

The CPU 22 controls the actuator of the HDA 10 to move the transducer (head) to a particular track on a disk or from a departure track to a destination track on the disk upon receipt of a write command provided by a host computer. The head reads the encoded read data (ERD) representing the particular track, which is transferred to the read/write channel circuit 14 via the preamplifier 12. The read/write channel circuit 14 transfers the ERD to the SAM detector 16 for subsequent detection of a servo address mark to recognize the particular pattern of the servo sector, which is synchronized and applied to the data sector end pulse generator 20 to generate a reference pulse to start the servo timing counter 18.

The CPU 22 also generates a SAM start signal to the SAM detector 16 for enabling the SAM detector 16 to begin SAM detection from servo sector when power is turned on. If the SAM is detected from the ERD signal via read/write channel circuit 14 while the SAM detector 16 is enabled, the SAM detector 16 produces a synchronous signal (SYNC) to servo timing counter 18. The servo timing counter 18 which is initialized by the synchronous signal generated by SAM detector 16, generates time value to data sector end pulse generator 20 while executing a counting operation. If the time value from the servo timing counter 18 corresponds to data loaded by CPU 22, data sector end pulse generator 20 generates an end of sector (ENDS) signal indicating an end of a data sector for SAM detector 16. Then SAM detector 16 is re-enabled by the ENDS signal from data sector end pulse generator 20 and detects the next SAM of the next servo sector.

The CPU 22 controls SAM detector 16 according to the servo states of a detection flag (DF) input by SAM detector 16 for every servo sector. Assuming that a track of a disk contains N servo sectors, the CPU 22 is interrupted N times and checks the servo states of each servo sector. In this situation, if an error is detected through the detection flag, CPU 22 disables the generation of all timings concerned with the servo and transmits a start signal to SAM detector 16 to restart the SAM detection for the pertinent servo sector. As I have noted earlier, however, contemporary disk drives often experience an overload because the CPU 22 must retry SAM detection for the pertinent servo sector where the SAM of the servo sector is not detected.

Figure 2:
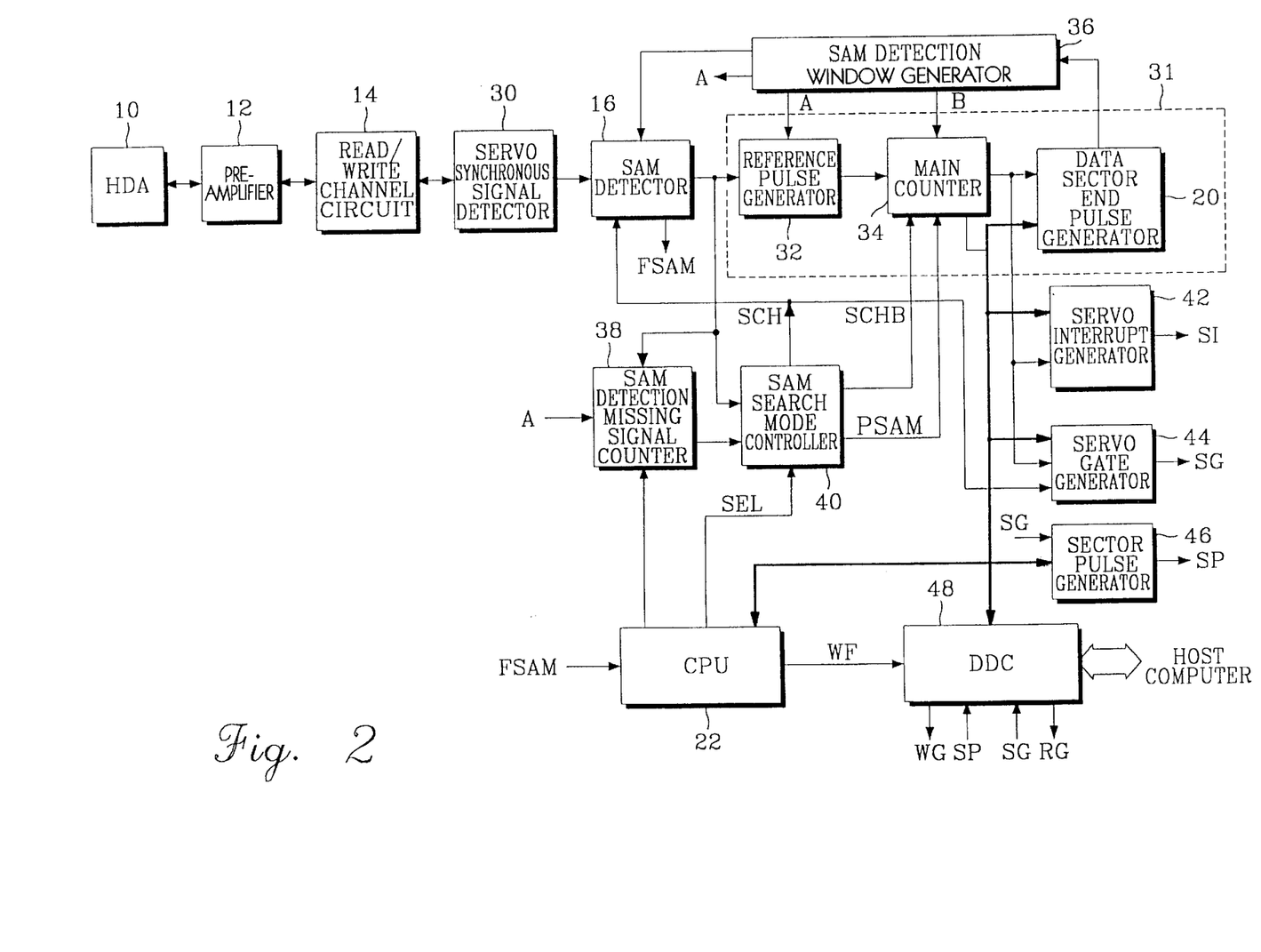
FIG. 2 is a block diagram of a disk drive including a circuit for automatically detecting a servo address mark contained in a servo sector and compensating for a delay in servo timing according to a preferred embodiment of the present invention.

Turning now to FIG. 2 which illustrates a disk drive having an automatic servo address mark detection and servo timing, compensation function according the principles of the present invention. In addition to a HDA 10, a pre-amplifier 12, a read/write channel circuit 14 and CPU 22 as required for contemporary disk drive as shown in FIG. 1, the disk drive constructed according to the present invention further includes a servo synchronous signal detector 30, a servo timing compensation circuit 31 which contains a reference pulse generator 32, a main counter 34, and a data sector end pulse generator 20, a SAM detection window generator 36, a SAM detection missing signal counter 38, a SAM search mode controller 40, a servo interrupt generator 42, a servo gate generator 44, a sector pulse generator 46, and a data disk controller (DDC) 48.

As shown in FIG. 2, servo synchronous signal detector 30 detects a servo synchronous signal, from the ERD originating from read/write channel circuit 14, and synchronizes the ERD to the system clock. SAM detector 16 detects a SAM from the ERD, which has been synchronized with the system clock, and outputs the SAM to servo timing compensation circuit 31. From this point forward, the signal output by SAM detector 16 is called a SAM detect output (SDO). After receiving the SDO, servo timing compensation circuit 31, which is composed of reference pulse generator 32, main counter 34, and data sector end pulse generator 20, compensates for the delayed servo sampling timing when the SAM has not been detected from a corresponding servo sector.

Servo timing compensation circuit 31, as described, includes a reference pulse generator 32, a main counter 34 and a data sector end pulse generator 20. Reference pulse generator 32 creates a reference pulse for generating the servo timing, in response to the input of SDO. Main counter 34 counts the system clocks in response to the reference pulse. If a count control signal B is input by SAM detection window generating circuit 36, the main counter 34 starts to count the values loaded from CPU 22 and compensates for the delay in timing where the SAM is not detected. The data sector end pulse generator 20 generates an ENDS pulse if the value of main counter 34, before a servo synchronous signal of a servo sector following the present servo sector which is being read, is detected and matches the value transmitted from the CPU 22. The ENDS pulse is sent to SAM detection window generating circuit 36.

Servo interrupt generator 42 outputs a servo interrupt (SI) if the value of main counter 34 corresponds the value transmitted by CPU 22 after a servo gate (SG). Upon receipt of the servo interrupt SI, the CPU 22 checks various status signals concerned with the servo sector detection and controls disk data controller (DDC) 48 for reading and writing. Where the value of main counter 34 matches the value transmitted by CPU 22, servo gate generator 44 generates the servo gate SG for protecting a servo sector area. Sector pulse generator 46 generates a sector pulse (SP) for reading the identification of a data sector in response to the servo gate SG. DDC 48 enables a read gate (RG) and write gate (WG) in response to the sector pulse SP.

SAM detection window generating circuit 36, which is enabled by the ENDS pulse from data sector end pulse generator 20, outputs a SAM detection missing signal A to reference pulse generator 32, and SAM detection missing signal counter 38 if the SAM detection is missed within the range of a window (SAMW [7:0]) loaded from CPU 22. SAM detection window generating circuit 36 also delays the output of SAM detection missing signal A for a predetermined period of time and outputs a count control signal B for compensating for the time delay, to main counter 34. Main counter 34 restarts a counting operation in response to a pseudo SAM (PSAM) input by SAM search mode controller 40.

SAM detection missing signal counter 38 counts the SAM detection missing signals, which are input by SAM detection window generating circuit 36, and outputs the results. SAM detection missing signal counter 38 partially compensates for a timing delay caused by sequential SAM detections.

SAM search mode controller 40 respectively outputs a SAM search signal SCH and PSAM from the SAM detection missing signal counter 38 to the main counter 34 and SAM detector 16 according to select signals, SELs (SEL$\phi$ and SEL1), which are input by CPU 22. The SAM search signal SCH which is input into the SAM detector 16, and the servo gate generator 44, sets the servo gate "HIGH" until the SAM is detected so that the read/write channel circuit 14 can generate the ERD of a servo sector. The CPU 22, which controls the hard disk drive, outputs the select signals SELs to SAM search mode controller 40 to select one PSAM and one SAM search signal among those output by the SAM detection missing signal counter 38. The CPU 22 controls the generation timings of the read gate RG, and write gate WG of DDC 48 after checking if the SAM is detected through the SAM input by the SAM detector 16.

FIGS. 3A and 3B to FIG. 5 illustrate the configurations of the servo timing circuit 31, SAM detection window generator 36, SAM detection missing signal counter 38, and SAM search mode controller 40 of the disk drive as constructed according to the present invention.

Figure 3A:
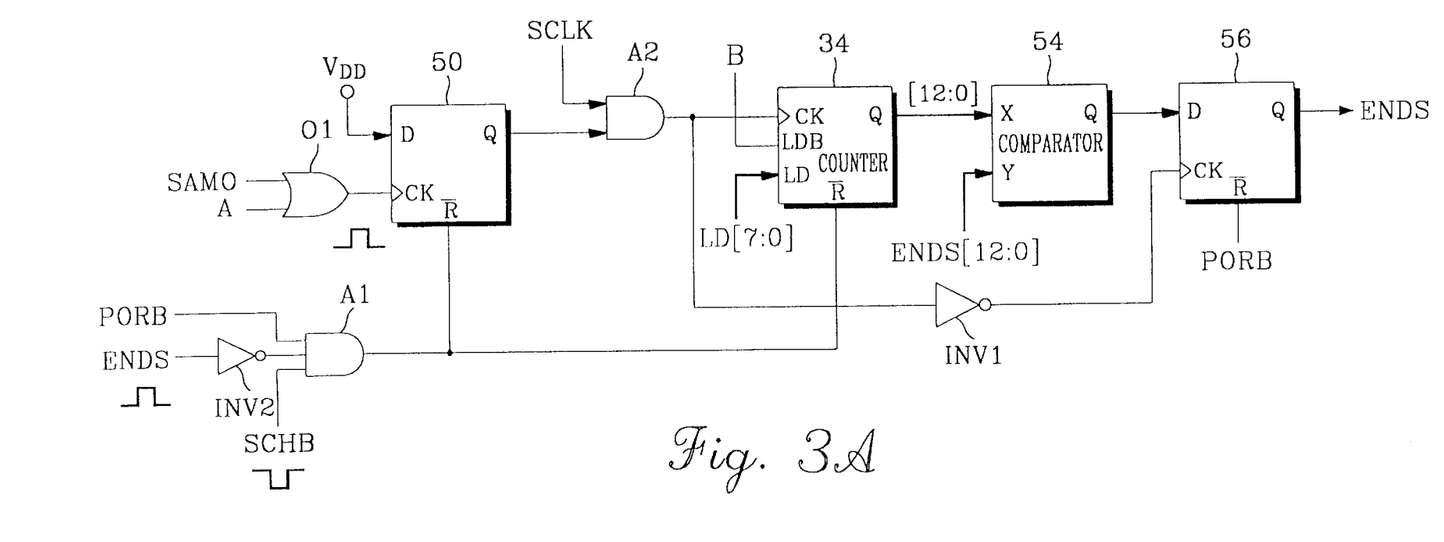
FIGS. 3A and 3B illustrate the configuration of a servo timing compensation circuit as shown FIG. 2.
Figure 3B:
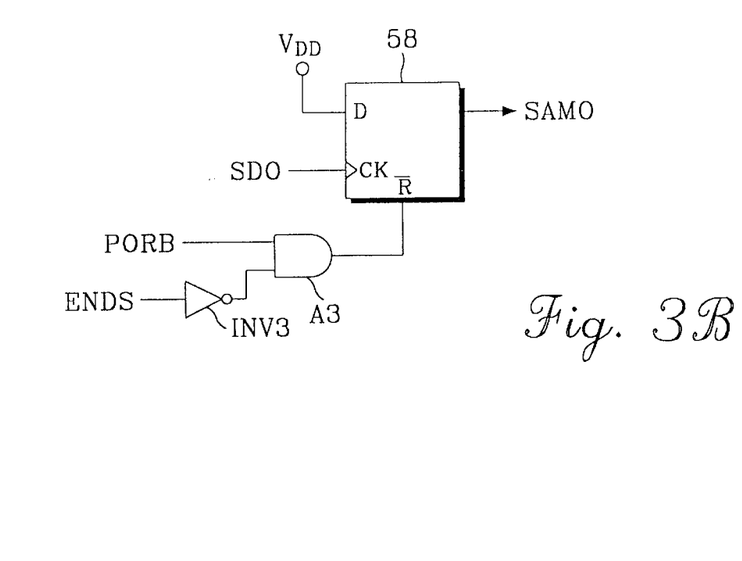

With reference to FIGS. 3A and 3B which illustrate the configuration of the servo timing compensation circuit of FIG. 2. Reference pulse generator 32 is composed of a D-flip-flop 58 as shown in FIG. 3B and a D-flip-flop 50 as shown in FIG. 3A. D-flip-flop 58 generates a SAM output SAMO after clocking a supply voltage $V_{DD}$ at the rising edge of the SAM detection output SDO. The SAMO is disabled at the rising edge of the ENDS output by the data sector end pulse generator 20. The SAMO is input into the clock terminal of D-flip-flop 50 after being ORed with the SAM detection missing signal A which is input by SAM detection window generating circuit 36. D-flip-flop 50 performs clocking and outputs the supply voltage $V_{DD}$ at the rising edge of the signal input by the OR gate O1. The output of D-flip-flop 50 is input into the clock terminal CK of main counter 34 after being ANDed with the system clock SCLK by AND gate A2.

Main counter 34 counts the output signals of AND gate A2 which are input through its clock terminal CK. Main counter 34 receives the count for a compensation of timing delay and a count control signal B from CPU 22 and SAM detection window generating circuit 36, respectively, through terminals LD and LDB. D-flip-flop 50 and main counter 34 are reset by the "LOW" signal output by the AND gate A1. AND gate A1 performs an AND operation with ENDS inverted by inverter INV2, a power on reset bar PORB, and a search bar SCHB, which is a SAM search signal. Comparator 54 which is included in data sector end pulse generator 20, compares the value input by main counter 34 through a terminal X with the ENDS data transmitted from CPU 22. If the count and the ENDS data match each other, comparator 54 outputs a "HIGH" ENDS. D-flip-flop 56 latches and outputs the ENDS at the rising edge of the signal which is inverted by a inverter INV1 after being output by the AND gate.

Figure 4:
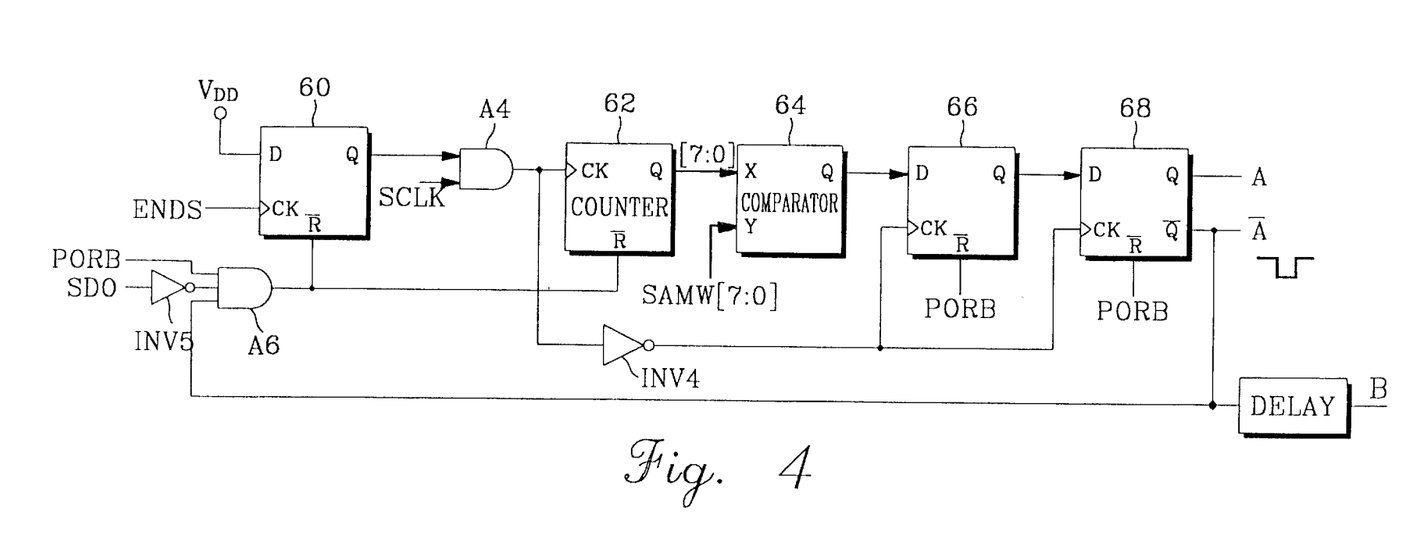
FIG. 4 illustrates the configuration of a servo address mark (SAM) detection window generator as shown in FIG. 2.

FIG. 4 illustrates a SAM detection window generator 36 of FIG. 2. SAM detection window generator 36 is composed of three D-flip-flops 60, 66, and 68, counter 62, and comparator 64. First D-flip-flop 60 performs clocking and outputs the supply voltage $V_{DD}$ at the rising edge of the ENDS input by data sector end pulse generator 20. AND gate A4 performs an AND operation with the output of D-flip-flop 60 and the system clock SCLK. Counter 62 counts the output signals of AND gate A4 input through its clock terminal CK, and outputs the counts of 8 bits. Comparator 64 compares the 8-bit SAM window data SAMW, transmitted from CPU 22 with the count input by counter 62. If the SAMW and the count match, comparator 64 generates a SAM detection missing signal A of a "HIGH" level. D-flip-flops 66 and 68 sequentially output the SAM detection missing signals A at the rising edge of the signal which is inverted by the inverter INV4 after being output by the AND gate A4. The SAM detection missing signal A output by D-flip-flop 68 indicates that the SAM detection is missed. The AND gate A6 performs an AND operation with the PORB, SDO which is inverted by the inverter INV5, and A which is output by the inverted 3 output terminal of D-flip-flop 68. D-flip-flop 60 and counter 62 are reset according to the result of the AND operation. Second and third D-flip-flops 66 and 68 are reset according to the PORB. Essentially, the SAM detection output SDO is transmitted to AND gate A6 through the inverter INV5 which resets D-flip-flop 60 and counter 62, in SAM detection window generating circuit 36 while the SAM detection is being performed. If the SAM detection missing signal A is not generated by the D-flip-flop 68, it is expected that the SAM is normally detected. However, D-flip-flop 68 generates the SAM detection missing signal A if the SAM detection is missed. Where the SAM is not detected within a predetermined range, SAM detection window generating circuit 36 sends the SAM detection missing signal A and counts control signal B for compensation of the count, to the load terminal LDB of main counter 34. Then main counter 34 starts to perform counting operation starting from data of 8 bits initially loaded from CPU 22 and compensates for a delay of servo sampling pulse timing in order to improve timing shift caused by misdetection of SAM in corresponding servo sector.

Figure 5:
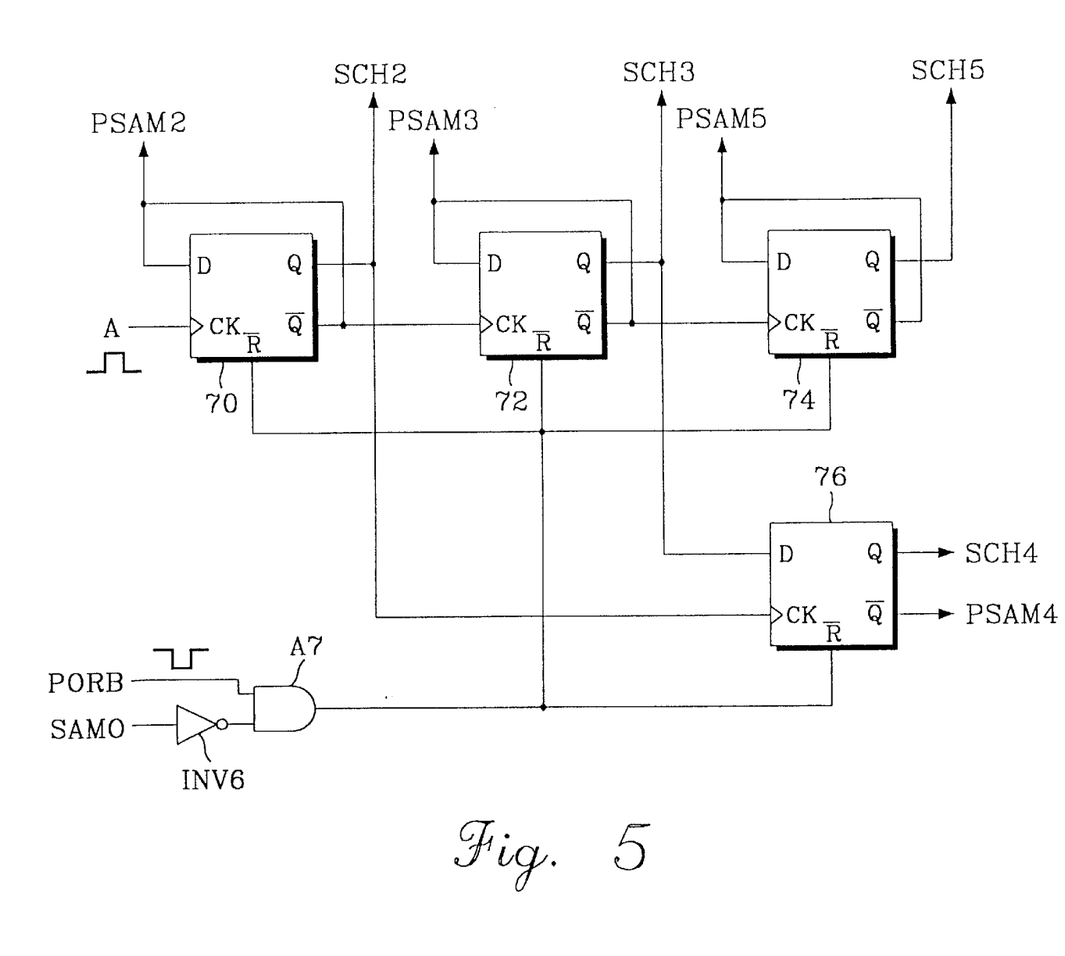
FIG. 5 illustrates the configuration of a servo address mark (SAM) detection missing signal counter as shown in FIG. 2.

FIG. 5 illustrates the configuration of the SAM detection missing signal counter of FIG. 2. SAM detection missing signal counter 38 is composed of a series of four successive D-flip-flops 70, 72, 74, and 76, inverter INV6, and AND gate A7. The SAM detection output SAMO, which is output by D-flip-flop 58 of reference pulse generator 32 and then passes through the inverter INV6, is ANDed with the PORB by the AND gate A7. The output of the AND gate A7 is used as a reset signal for D-flip-flops 70, 72, 74 and 76. First D-flip-flop 70 performs clocking and outputs a signal input through its inverted output terminal $\overline{Q}$ at the rising edge of the SAM detection missing signal A input from SAM detection window generating circuit 36. A signal output through the Q terminal of D-flip-flop 70 is a SAM search signal SCH2, which is input into SAM search mode controller 40. PSAM 2, which is output through the inverted output terminal $\overline{Q}$ of D-flip-flop 70, is also input into SAM search mode controller 40. Second D-flip-flop 72 performs clocking and outputs a signal which is input through its inverted output terminal $\overline{Q}$ at the rising edge of the PSAM 2 input from the inverted output terminal $\overline{Q}$ of D-flip-flop 70. A SAM search signal, SCH3, and PSAM3 are output through the output terminal Q and inverted output terminal $\overline{Q}$ by D-flip-flop 72. They are input into SAM search mode controller 40. Third D-flip-flop 74 performs clocking and outputs a signal input through its inverted output terminal $\overline{Q}$ at the rising edge of the PSAM 3 input from the inverter output terminal $\overline{Q}$ of D-flip-flop 72. A SAM search signal SCH5, and PSAM5 are output through the output terminal Q and inverted output terminal $\overline{Q}$ by D-flip-flop 74. They are input into SAM search mode controller 40. Fourth D-flip-flop 76 performs clocking for a signal which is input from the non-invert output terminal Q of D-flip-flop 72, at the rising edge of the signal output through the non-inverter output terminal Q of D-flip-flop 70, and outputs a SAM search signal SCH4. Fourth D-flip-flop 76 outputs a PSAM4 through its inverted output terminal $\overline{Q}$ into SAM search mode controller 40.

Figure 6:
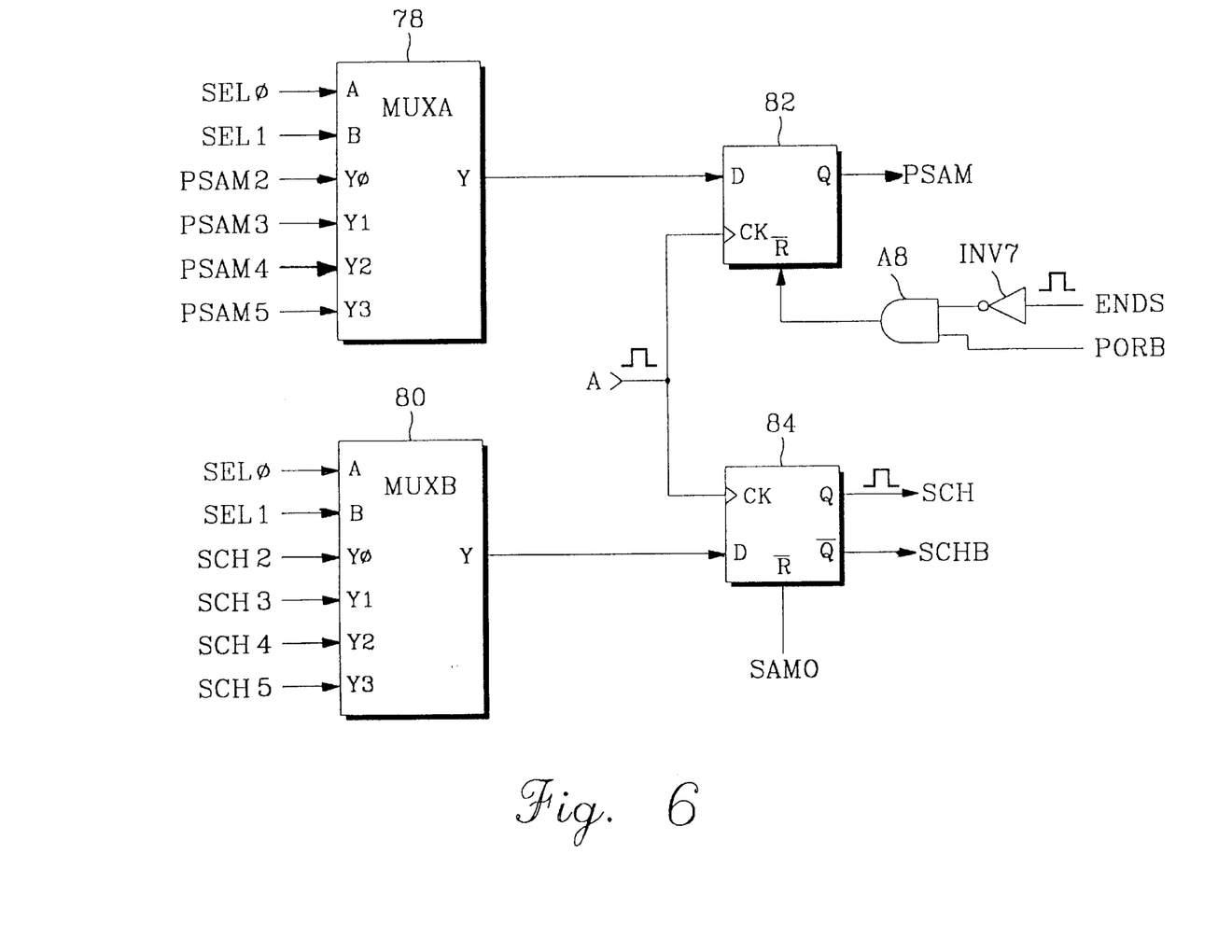
FIG. 6 illustrates the configuration of a servo address mark (SAM) search mode controller as shown in FIG. 2.

FIG. 6 illustrates the configuration of the SAM search mode controller of FIG. 2. According to select signals SELφ and SEL1 input by CPU 22, MUX A 78 and MUX B 80 respectively select one PSAM and one SAM search signal SCH among those input by SAM detection missing signal counter 38. D-flip-flops 82 and 84 respectively perform clocking and latch the signals input from each output terminal Y of the MUX A and B at the rising edge of the SAM detection missing signal A output by SAM detection window generating circuit 36. An inverter INV7 inverts the ENDS input by data sector end pulse generator 20. An AND gate A8 performs an AND operation with the output of the inverter INV7 and PORB, and generates a signal for resetting D-flip-flop 82. D-flip-flop 84 is reset by the SAM detection output SAMO input by reference pulse generator 32.

Figure 7A:
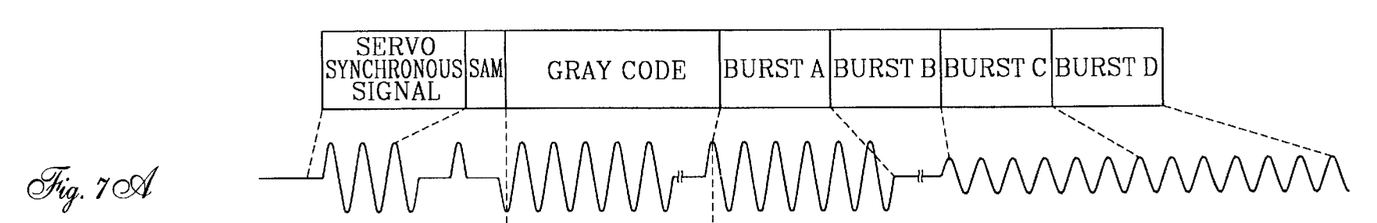
FIGS. 7A–7H are timing diagrams illustrating where the servo address mark (SAM) is detected.
Figure 7B:
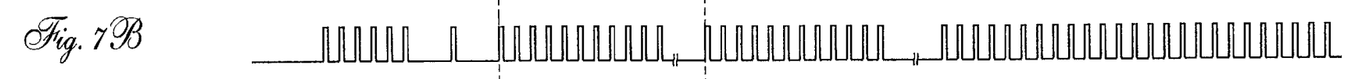
Figure 7C:
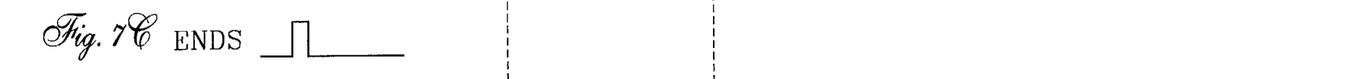
Figure 7D:
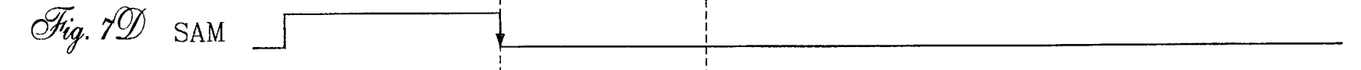
Figure 7E:
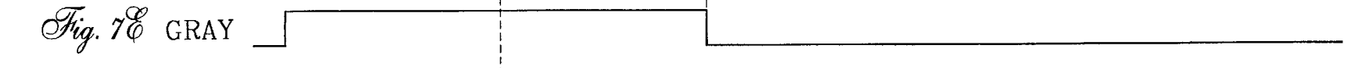
Figure 7F:
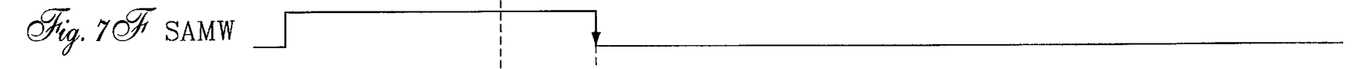
Figure 7G:
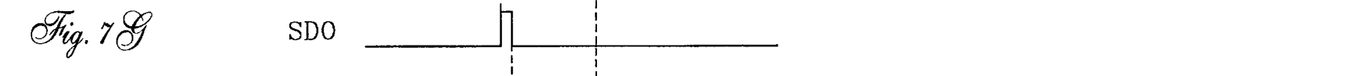
Figure 7H:
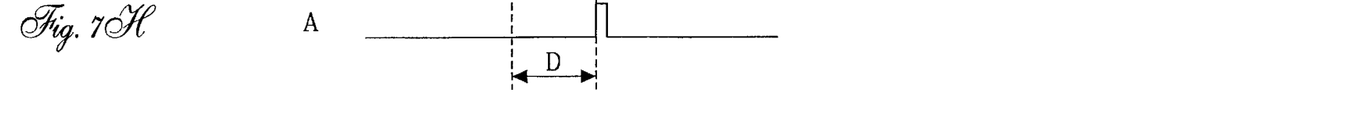

FIGS. 7A–7H are tiring diagrams of how a SAM of a corresponding servo sector is detected. For example, FIG. 7A illustrates a waveform of an analog read signal which is read from a servo sector by a transducer head. FIG. 7B illustrates a waveform of a digital signal resulted from performing a waveform shaping for the analog read signal. FIG. 7C illustrates generation of an ENDS signal which is a signal generated by data sector end pulse generator 20 at the end point of the data sector preceding the servo sector as illustrated in FIG. 7A. FIG. 7D illustrates generation of a SAM signal which is a signal enabled with the ENDS at the same time and disabled where the SAM is detected within a SAM detection window range. FIG. 7E illustrates generation of a GRAY signal which is a signal enabled with the ENDS and disabled where the GRAY code contained in the servo sector is terminated. FIG. 7F illustrates generation of a SAMW signal which is a SAM detection window set for enabling detection of SAM therein. FIG. 7G illustrates a SDO signal which is generated when SAM is detected by SAM detector 16, and main counter 34 is started for counting operation. FIG. 7H illustrates generation of aSAM detection missing signal A which is generated at an end point of the SAM detection window SAMW. SAM detection window generator 36 sends the count control signal B for a compensation of timing difference (D) between the SDO and SAM detection missing signal A, so compensates for the timing delay in the case of SAM detection missing. Therefore, servo sampling pulses are generated at predetermined points even though the SAM detection missing signal A is output.

Figure 8A:
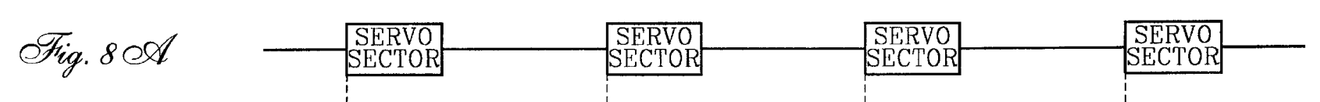
FIGS. 8A–8F are timing diagrams according to the preferred embodiment of the present invention.
Figure 8B:
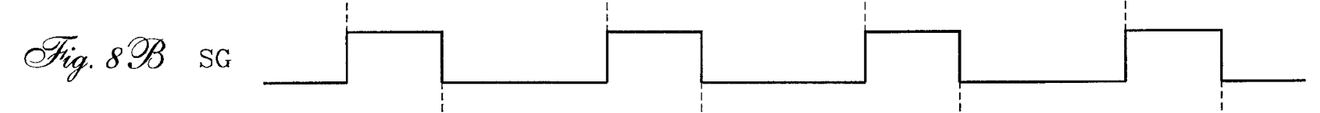
Figure 8C:
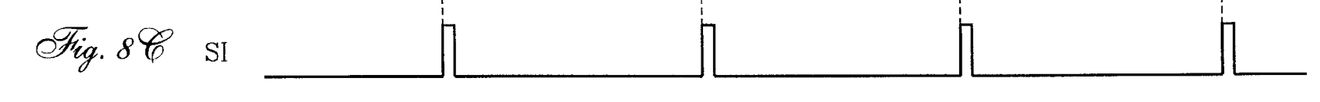
Figure 8D:
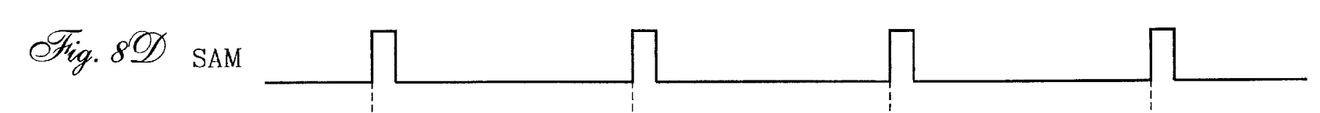
Figure 8E:
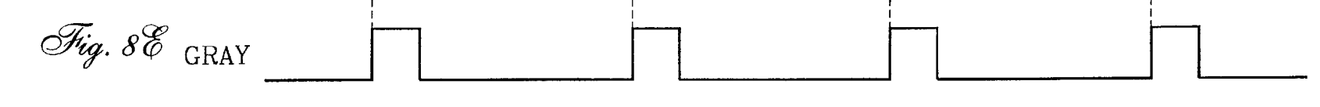
Figure 8F:
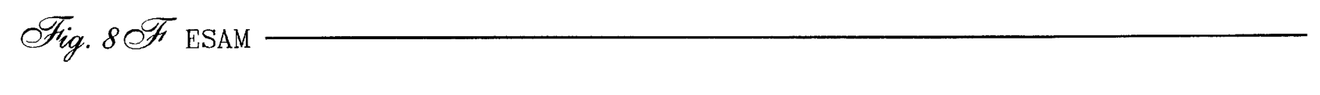

FIGS. 8A–8F which are timing diagrams illustrating where SAMs are detected. Generally, as shown FIGS. 8A–8F, SAMs are all detected at four servo sectors. FIG. 8A illustrates servo sector pattern from the ERD signal from transducer head. FIG. 8B illustrates generation of a SG signal which is a servo gate generated by servo gate generator 44 in response thereto. FIG. 8C illustrates generation of a SI signal which is a servo interrupt generated by servo interrupt generator 42. FIG. 8D illustrates generation of SAM signal which is generated by SAM detector 16 and input into CPU 22, and enabled by the ENDS and disabled where the SAM is detected. FIG. 8E illustrates generation of a GRAY signal which is enabled by the ENDS and disabled at the end point of the block of Gray code in a servo sector. FIG. 8F illustrates generation of an error SAM (ESAM) which is enabled where the SAM detection is missed, and disabled where the SAM is detected.

Figure 9A:
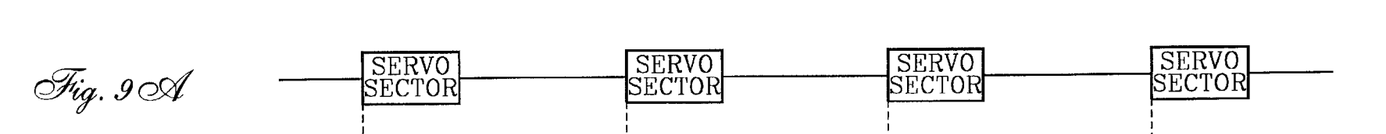
FIGS. 9A–9F are timing diagrams according to the preferred embodiment of the present invention.
Figure 9B:
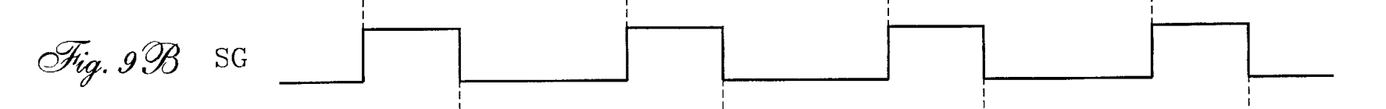
Figure 9C:
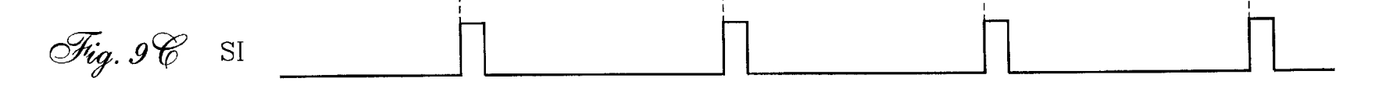
Figure 9D:
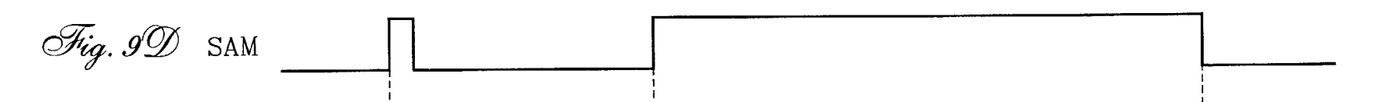
Figure 9E:
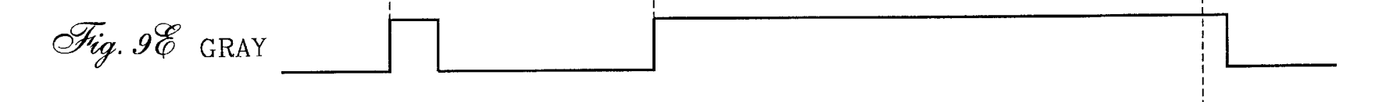
Figure 9F:
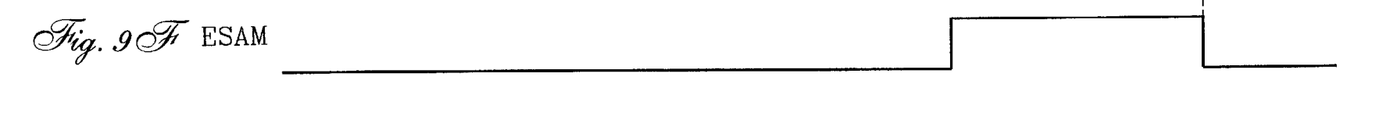

FIGS. 9A–9F are timing diagrams illustrating where the second and third SAMs, which are missed during normal SAM detection operation, are to be detected. Similar to FIGS. 8A–8C, FIGS. 9A–9C also illustrate servo sector pattern from the ERD signal from transducer head, and generation of a SG signal which is a servo gate generated by servo gate generator 44 and a SI signal which is a servo interrupt generated by servo interrupt generator 42. Where the second and third SAMs which are missed during SAM detection operation, are to be detected, the flag of SAM output by SAM detector 16 as shown in FIG. 9D becomes "HIGH" level. The flag of ESAM as shown in FIG. 9F becomes "HIGH" when SAM detector 16 misses to detect the SAM of the third servo sector. The ESAM is disabled when a SAM is detected at the fourth servo sector.

A process of automatically detecting a servo address mark and compensating for a servo timing delay according to the principles of the present invention will now be described with reference to FIGS. 3A to FIG. 8F hereinbelow.

The SAM detection output SDO, which is detected by SAM detector 16, is input into the clock terminal of D-flip-flop 58 of FIG. 3B. D-flip-flop 58 generates the "HIGH" SAMO. The "HIGH" SAMO output by D-flip-flop 58 is input into SAM detection missing signal counter 38, SAM search mode controller 40, and OR gate O1 of FIG. 3A. D-flip-flop 50 of reference pulse generator 32 latches the supply voltage $V_{DD}$ at the rising edge of the output of the OR gate O1, and outputs a signal of "HIGH" level into the AND gate A2. The AND gate A2 performs an AND operation with the output of D-flip-flop 50 and the system clock SCLK, and outputs the result into the clock terminal CK of main counter 34. Main counter 34 counts the signals input through its clock terminal CK from the AND gate A2. Comparator 54 generates a "HIGH" level signal if the ENDS transmitted from CPU 22 matches the count. The ENDS is output from the terminal Q of D-flip-flop 56 and input into the clock terminal CK of D-flip-flop 60 of FIG. 4. D-flip-flops 50 and 58 and main counter of reference pulse generator are reset by the ENDS. D-flip-flop 60 performs a timing operation and outputs the supply voltage $V_{DD}$ at the rising edge of the ENDS input through its clock terminal CK. The AND gate A4 performs an AND operation with the system clock, SCLK, and the output of D-flip-flop 60, and outputs the result into counter 62. Counter 62 counts the system clocks. Comparator 64 which receives the count through the terminal X, generates a "HIGH" level signal where the count matches the length of window SAMW, which is determined by CPU 22. D-flip-flops 66 and 68 latch the output of comparator 64, and then generates the SAM detection missing signal A. The count control signal B which is output through the inverted output terminal $\overline{Q}$ of D-flip-flop 68, is sent to the LDB terminal of main counter 34 after being delayed for a predetermined period of time. Where the SAM detector 16 detects a SAM, the SDO is input into the AND gate A6 through the inverter INV5, and then resets D-flip-flop 60 and counter 62. Where the SAM is detected, D-flip-flop 68 does not generate the SAM detection missing signal A. Where the SAM is not detected, the SAM detection missing signal A is generated. SAM detection window generating circuit 36 outputs the count control signal B into the LDB terminal of main counter 34, so that main counter 34 can start to count LD initially transmitted by CPU 22. Therefore, the circuit compensates for the delay of the servo sampling pulse timing in order to improve a timing shift caused by a SAM detection missing. The SAM detection missing signal A which is generated from SAM detection window generating circuit 34, is input into the clock terminal CK of D-flip-flop 70 of SAM detection missing signal counter 38, simultaneously, it is input into the clock terminals of D-flip-flops 82 and 84 of SAM search mode controller 40. Where CPU 22 sequentially notifies that the SAM is not detected five times, using the select signals SEL$\phi$ and SEL1, D-flip-flops 70, 72, 74, and 76 which received the SAM detection missing signal A, latch and output PSAM 2, 3, 4, 5 and SCH2, 3, 4, 5, respectively, and output them into MUX A and B, 78 and 80, of SAM search mode controller 40. First and second multiplexers MUX A and B, 78 and 80, respectively select one PSAM and one SCH according to the select signals SEL100 and SEL1 input by CPU 22. D-flip-flops 82 and 84 respectively latch and output the signals input by MUX A and B, 78 and 80, at the rising edge of the SAM detection missing signal A. The search signal SCHB which is input by D-flip-flop 84, stops main counter 34. The search signal SCH enables SAM detector 16 to re-detect the SAM.

As described above, the present invention automatically compensates for the delay of servo sampling pulse timing where a SAM is not detected. The present invention also automatically searches and detects SAMs up to a predetermined number even though a SAM detection is sequentially missed.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An automatic servo address mark detecting and servo timing compensating circuit of a disk drive including a controller which stores and outputs initial values for detecting servo and data information in synchronization with a point of servo address mark detection, said circuit comprising:

a servo address mark detection window generating unit for generating a servo address mark detection missing signal and a count control signal where the servo address mark is not detected within a range of a servo address mark window of a predetermined servo sector;

a servo address mark missing signal counter, which is reset according to a servo address mark detection signal, for generating a servo address mark search signal and a pseudo servo address mark signal when a servo address mark detection missing signal count corresponds to data loaded from said controller;

a servo address mark search mode controller for selecting one of the servo address mark search signal and the pseudo servo address mark signal in response to a select signal loaded from said controller; and a servo timing compensation unit for counting system clocks, starting from the data loaded from said controller, and compensating for a delay of servo timing in response to the count control signal.

2. The circuit of claim I, further comprised of said servo timing compensation unit comprising:

a reference pulse generator for generating a reference pulse to create a servo timing where the servo address mark detection signal is input from a servo address mark detector;

a main counter for counting the system clocks where the reference pulse is input, and for counting the data loaded from said controller where the count control signal is input; and a data sector end pulse generator for generating a data sector end pulse to enable generation of the servo address mark window where the servo address mark detection missing signal count from said main counter corresponds to data loaded from said controller.

3. The circuit of claim 2, further comprised of said servo address mark detection missing signal being generated and enabled at an end point of the servo address mark window.

4. The circuit of claim 3, further comprised of said count control signal corresponding to an inverted signal of the servo address mark detection missing signal.

5. The circuit of claim 4, further comprised of said servo address mark detector being re-enabled by the servo address mark search signal to detect the servo address mark of next servo sector from data read from the disk.

6. The circuit of claim 5, further comprised of said reference pulse generator comprising:

a first flip-flop for performing a clocking for a supply voltage at a rising edge of the servo address mark detection signal input from the servo address mark detector;

a first OR gate for performing an OR operation with an output of the first flip-flop and the servo address mark detection missing signal; and a second flip-flop for performing a clocking for the supply voltage at a rising edge of the output of the first OR gate and generating the reference pulse.

7. The circuit of claim 6, further comprised of said main counter comprising:

a first AND gate for performing an AND operation with the reference pulse input from the reference pulse generator and the system clocks; and a counter for recounting the system clocks, staring from the data loaded from said controller where the count control signal is input while counting the system clocks output from the first AND gate.

8. The circuit of claim 7, further comprised of said data sector end pulse generator comprising:

a third flip-flop for generating a data sector end pulse of a "HIGH" level where the servo address mark detection missing signal count output from said main counter corresponds to the initial—values loaded from said controller; and a fourth flip-flop for latching and outputting the data sector end pulse of the third flip-flop at a rising edge of a signal which is a result of AND gate of the reference pulse and the system clocks.

9. The circuit of claim 8, further comprised of said servo address mark detection window generating unit comprising:

a fifth flip-flop, which is reset by the servo address mark detection signal, for latching and outputting the supply voltage at a rising edge of the data sector end pulse input from the data sector end pulse generator;

a second AND gate for performing an AND operation with the supply voltage output from the fifth flip-flop and the system clocks;

a second counter, which is reset by the servo address mark detection signal, for counting an output signal of the second AND gate;

a comparator for generating the servo address mark detection missing signal where a system clock count output from the second counter corresponds to initial window data loaded from said controller; and a sixth flip-flop for latching and outputting the servo address mark detection missing signal output from the comparator at a rising edge of the output of the second AND gate.

10. The circuit of claim 9, further comprised of said servo address mark search mode controller comprising:

a seventh flip-flop for latching and outputting the servo address mark search signal output from the servo address mark detection missing signal counter, at a rising edge of the servo address mark detection missing signal; and a eighth flip-flop for latching and outputting the pseudo servo address mark output from the servo address mark detection missing signal counter, at a rising edge of the servo address mark detection missing signal.

11. The circuit of claim 10, wherein the seventh flip-flop is reset by the servo address mark detection signal.

12. The circuit of claim 11, wherein the eighth flip-flop is reset by the data sector end pulse.

13. The circuit of claim 1, further comprised of said servo address mark detection window generating unit comprising:

a first flip-flop, which is reset by the servo address mark detection signal, for latching and outputting the supply voltage at a rising edge of the data sector end pulse input from the data sector end pulse generator;

a second AND gate for performing an AND operation with the supply voltage output from the first flip-flop and system clocks;

a servo counter, which is reset by the servo address mark detection signal, for counting an output signal of the second AND gate;

a comparator for generating the servo address mark detection missing signal where a system clock count output from the servo counter corresponds to initial window data loaded from said controller; and a second flip-flop for latching and outputting the servo address mark detection missing signal output from the comparator at a rising edge of the output of the second AND gate.

14. The circuit of claim 1, further comprised of said servo address mark search mode controller comprising:

a first flip-flop for latching and outputting the servo address mark search signal output from the servo address mark detection missing signal counter, at a rising edge of the servo address mark detection missing signal; and a second flip-flop for latching and outputting the pseudo servo address mark output from the servo address mark detection missing signal counter, at a rising edge of the servo address mark detection missing signal.

15. A circuit for automatic servo address mark detecting and servo timing compensating for servo address mark misdetection of a disk drive which includes a rotating disk having a plurality of concentric data tracks and servo sectors embedded within the data tracks, and a transducer positioned to read data from a data track selected from said concentric data tracks, said circuit comprising:

a controller for controlling operation of said disk drive including detecting servo and data information in synchronization with servo address mark detection;

a servo address mark detector for detecting the servo address mark from data read from the disk and generating therefrom a servo address mark detection signal;

a servo address mark detection window generating unit for generating a servo address mark detection missing signal and a count control signal, when the servo address mark is not detected within a range of a servo address mark window of a predetermined servo sector;

a servo address mark missing signal counter, which is reset according to said servo address mark detection signal, for generating a servo address mark search signal and a pseudo servo address mark signal, when a servo address mark detection missing signal count corresponds to data loaded from said controller;

a servo address mark search mode controller for selecting one of the servo address mark search signal and the pseudo servo address mark signal in response to a select signal loaded from said controller; and a servo timing compensation unit for counting system clocks, starting from the data loaded from said controller, and compensating for a delay of servo timing in response to the count control signal.

16. The circuit of claim 15, fierier comprised of said servo timing compensation unit comprising:

a reference pulse generator for generating a reference pulse to create a servo timing in response to receipt of the servo address mark detection signal;

a main counter for counting system clocks where the reference pulse is input, and for counting the data loaded from said controller where the count control signal is input; and a data sector end pulse generator for generating a data sector end pulse to enable generation of the servo address mark window when the servo address mark detection missing signal count from said main counter corresponds to data loaded from said controller.

17. The circuit of claim 16, further comprised of said reference pulse generator comprising:

a first flip-flop for performing a clocking for a supply voltage at a rising edge of the servo address mark detection signal;

a first OR gate for performing an OR operation with an output of the first flip-flop and the servo address mark detection missing signal; and a second flip-flop for performing a clocking for the supply voltage at a rising edge of the output of the first OR gate and generating the reference pulse.

18. The circuit of claim 17, further comprised of said main counter comprising:

a first AND gate for performing an AND operation with the reference pulse and the system clocks; and a counter for recounting the system clocks, starting from the data loaded from said controller where the count control signal is input while counting the system clocks output from the first AND gate.

19. The circuit of claim 18, further comprised of said data sector end pulse generator comprising:

a third flip-flop for generating a data sector end pulse of a "HIGH" level where the servo address mark detection missing signal count corresponds to the initial-values loaded from said controller; and a fourth flip-flop for latching and outputting the data sector end pulse of the third flip-flop at a rising edge of a signal which is a result of AND gate of the reference pulse and the system clocks.

20. The circuit of claim 15, further comprised of said servo address mark detection window generating unit comprising:

a first flip-flop, which is reset by the servo address mark detection signal, for latching and outputting the supply voltage at a rising edge of the data sector end pulse;

a second AND gate for performing an AND operation with the supply voltage output from the first flip-flop and system clocks;

a servo counter, which is reset by the servo address mark detection signal, for counting an output signal of the second AND gate;

a comparator for generating the servo address mark detection missing signal where a system clock count output from the servo counter corresponds to initial window data loaded from said controller; and a second flip-flop for latching and outputting the servo address mark detection missing signal output from the comparator at a rising edge of the output of the second AND gate.

21. The circuit of claim 15, further comprised of said servo address mark search mode controller comprising:

a first flip-flop for latching and outputting the servo address mark search signal output from the servo address mark detection missing signal counter, at a rising edge of the servo address mark detection missing signal; and a second flip-flop for latching and outputting the pseudo servo address mark output from the servo address mark detection missing signal counter, at a rising edge of the servo address mark detection missing signal.

22. A process of automatic servo address mark detecting and servo timing compensating for servo address mark misdetection of a disk drive which includes a rotating disk having a plurality of concentric data tracks and servo sectors embedded within the data tracks, a transducer positioned to read data from a data track selected from said concentric data tracks and a controller, said process comprising the steps of:

detecting the servo address mark from data read from the disk and generating therefrom a servo address mark detection signal;

generating a servo address mark detection missing signal and a count control signal, when the servo address mark is not detected within a range of a servo address mark window of a predetermined servo sector;

generating a servo address mark search signal and a pseudo servo address mark signal upon reset of said servo address mark detection signal, when a servo address mark detection missing signal count corresponds to data loaded from said controller;

selecting one of the servo address mark search signal and the pseudo servo address mark signal in response to a select signal loaded from said controller; and counting system clocks, starting from the data loaded from said controller, and compensating for a delay of servo timing due to servo address mark misdetection in response to the count control signal.

* * * * *